(12) United States Patent
Kobayashi

(10) Patent No.: US 10,061,944 B2
(45) Date of Patent: Aug. 28, 2018

(54) ELECTRONIC WHITEBOARD SYSTEM, ELECTRONIC WHITEBOARD ACCESS RIGHT GIVING METHOD AND ITS PROGRAM

(71) Applicant: NEC Corporation, Minato-ku, Tokyo (JP)

(72) Inventor: Hiroyuki Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 246 days.

(21) Appl. No.: 15/054,362

(22) Filed: Feb. 26, 2016

(65) Prior Publication Data

US 2016/0267287 A1 Sep. 15, 2016

(30) Foreign Application Priority Data

Mar. 13, 2015 (JP) ................................. 2015-050691

(51) Int. Cl.
| | |
|---|---|
| *G06F 15/00* | (2006.01) |
| *G06F 13/00* | (2006.01) |
| *G06F 21/83* | (2013.01) |
| *G06F 3/0488* | (2013.01) |
| *G06F 21/84* | (2013.01) |

(52) U.S. Cl.
CPC .......... *G06F 21/83* (2013.01); *G06F 3/04883* (2013.01); *G06F 21/84* (2013.01); *G06F 2221/2141* (2013.01)

(58) Field of Classification Search
CPC ............................... G06F 21/62; G06F 3/0482
USPC .................................................. 715/730, 788
See application file for complete search history.

(56) References Cited

U.S. PATENT DOCUMENTS

| | | | | |
|---|---|---|---|---|
| 5,687,254 | A * | 11/1997 | Poon .................. | G06K 9/00335 382/187 |
| 9,640,144 | B2 * | 5/2017 | Shimizu .............. | G06F 3/04883 |
| 2004/0212629 | A1 * | 10/2004 | Ohkawa ................ | H04N 7/147 345/629 |
| 2004/0217946 | A1 * | 11/2004 | Hamano ............... | G06F 17/242 345/173 |
| 2010/0141661 | A1 * | 6/2010 | Kojima .................... | G09B 7/00 345/473 |
| 2014/0164984 | A1 * | 6/2014 | Farouki ................ | G06F 3/0481 715/784 |

(Continued)

FOREIGN PATENT DOCUMENTS

| | | |
|---|---|---|
| JP | 2003-281101 A | 10/2003 |
| JP | 5369800 B2 | 9/2013 |

*Primary Examiner* — Kevin Nguyen

(57) ABSTRACT

An electronic whiteboard system includes a server device 10 including a storage device 11 that stores electronic whiteboard data of an electronic whiteboard and area data of a plurality of areas obtained by dividing the electronic whiteboard, and object data of an object in the area, and an SV communication unit 13 that performs data communication with client terminals 20*a*, . . . , and an access right determination unit 14 that gives an access right for each user for each of the divided areas and determines permission/prohibition of access based on the given access right, and the client terminals 20*a*, . . . that include a CL communication unit 23 that performs data communication with the server device 10, and an output device 24 that acquires the electronic whiteboard data, and the like from the server device 10, converts the acquired data into drawing data, and displays the drawing data.

10 Claims, 13 Drawing Sheets

(56) References Cited

U.S. PATENT DOCUMENTS

2015/0278983 A1* 10/2015 Uefuji .................... G09G 5/003
                                                                          345/173

* cited by examiner

100
AREA DATA
SETTING TABLE

| WHITEBOARD ID | AREA ID | X-COORDINATE | Y-COORDINATE | WIDTH | HEIGHT |
|---|---|---|---|---|---|
| 1 | A1 | 0 | 0 | 100 | 50 |
| 1 | A2 | 100 | 0 | 300 | 50 |
| 1 | A3 | 400 | 0 | 80 | 50 |
| 1 | B1 | 0 | 50 | 250 | 150 |
| 1 | B2 | 250 | 50 | 230 | 150 |
| 1 | C1 | 0 | 200 | 480 | 50 |
| 2 | A1 | 0 | 0 | 300 | 300 |
| 2 | B1 | 0 | 300 | 100 | 50 |
| 2 | B2 | 100 | 300 | 100 | 50 |
| 2 | B3 | 200 | 300 | 100 | 50 |
| ... | | | | | |

Fig. 3

110
ACCESS RIGHT DATA
SETTING TABLE

| WHITEBOARD ID | AREA ID | USER ID |
|---|---|---|
| 1 | A1 | 4 |
| 1 | A1 | 5 |
| 1 | A1 | 6 |
| 1 | C1 | 4 |
| 2 | B2 | 20 |
| ... | | |

Fig. 4

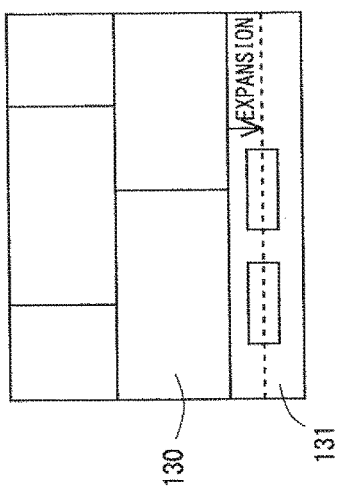
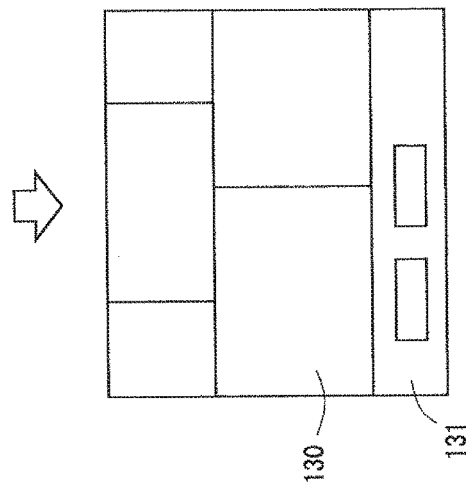
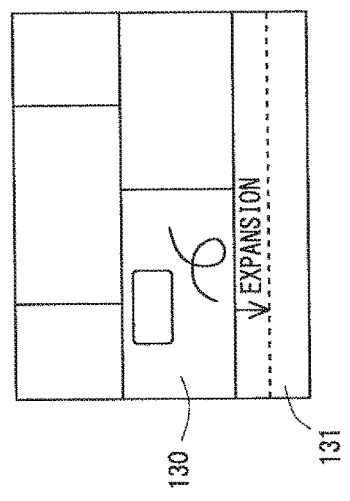
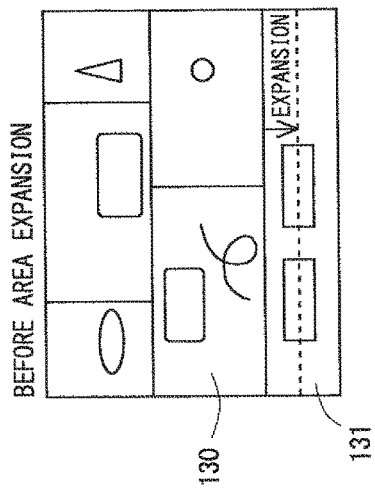
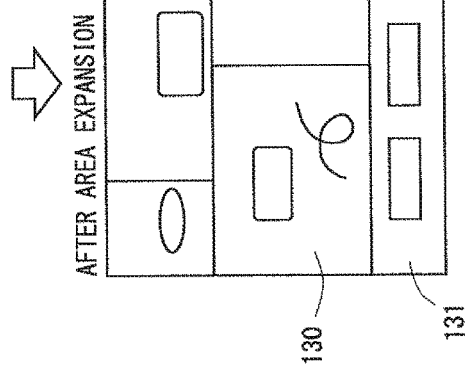

Fig. 11

110A ACCESS RIGHT DATA SETTING TABLE

| WHITEBOARD ID | AREA ID | USER ID | ACCESS RIGHT ATTRIBUTE | | | | | |
|---|---|---|---|---|---|---|---|---|
| | | | DISPLAY RIGHT | OBJECTION CREATING RIGHT | OBJECT EDIT RIGHT | OBJECT DELETE RIGHT | AREA EXPANSION RIGHT | AREA EXPANSION AVAILABLE QUANTITY |
| 1 | A1 | 4 | 1 | 1 | 1 | 1 | 1 | 2 |
| 1 | A1 | 5 | 1 | 1 | 1 | 1 | 1 | 2 |
| 1 | A1 | 6 | 1 | 0 | 0 | 0 | 0 | |
| 1 | C1 | 4 | 1 | 1 | 0 | 0 | 0 | |
| 2 | B2 | 20 | 1 | 1 | 1 | 1 | 1 | 3 |
| ... | | | | | | | | |

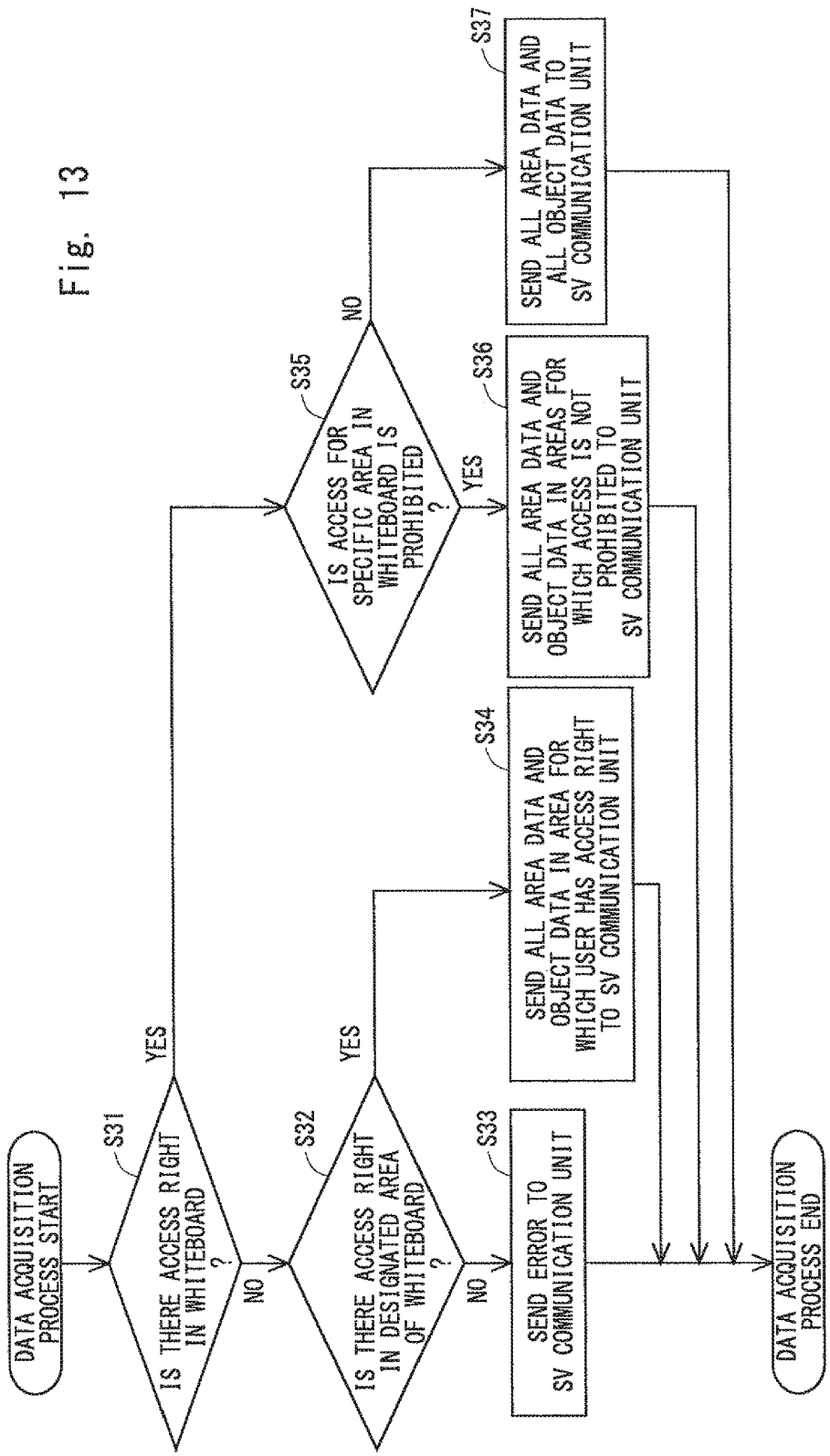

ELECTRONIC WHITEBOARD SYSTEM, ELECTRONIC WHITEBOARD ACCESS RIGHT GIVING METHOD AND ITS PROGRAM

INCORPORATION BY REFERENCE

This application is based upon and claims the benefit of priority from Japanese patent application No. 2015-050691, filed on Mar. 13, 2015, the disclosure of which is incorporated herein in its entirety by reference.

BACKGROUND OF THE INVENTION

1. Technical Field

The present invention relates to an electronic whiteboard system, an electronic whiteboard access right giving method, and an electronic whiteboard access right giving program. In particular, the present invention relates to an electronic whiteboard system, an electronic whiteboard access right giving method, and an electronic whiteboard access right giving program capable of giving an access right to a specific area on an electronic whiteboard.

2. Background Art

Recently, electronic whiteboards such as electronic blackboards and electronic whiteboard functions of Web conferences have increasingly come into wide use. In an electronic whiteboard, objects such as text, figures, and images can be drawn in a virtual canvas, and they can be shared among a plurality of users. Further, since an area on an electronic whiteboard can be expanded, a number of information pieces can be arranged in one area. However, when the size of the electronic whiteboard becomes larger and a number of information pieces (objects) are arranged in one area, it is very difficult to grasp the overall information (objects) and the structure of the electronic whiteboard. In such a case, information (objects) can be easily summarized by dividing the electronic whiteboard into a plurality of areas. In view of this, a number of methods for dividing an electronic whiteboard into a plurality of areas have been proposed.

Meanwhile, for the case where information is shared with another person(s) by using an electronic whiteboard that is divided into a plurality of areas, there is a demand that the electronic whiteboard should be able to carry information thereon in such a manner that personal memos and the like are separated from information that is arranged to be shared with the other person(s), i.e., an area containing therein information that should be concealed from the other person(s) is separated from an area containing therein information that is desired to be shared with the other person(s). To answer this demand, Japanese Unexamined Patent Application Publication No. 2003-281101, for example, proposes a technique related to "Electronic Conference System".

Japanese Unexamined Patent Application Publication No. 2003-281101 proposes the following mechanism. An electronic whiteboard is divided into a plurality of windows including an individual screen display window for each individual and a shred screen display window shared by every individual. For example, when a given individual attempts to edit a document written in the shared screen display window, the same part of the document to be edited is displayed in both the individual screen display window for that individual and the shred screen display window. Then, letters that are entered for the editing purpose are displayed only on the individual screen display window before that individual enters an input end symbol for the editing, and then when the input end symbol is entered, the editing result is finally displayed on the shared screen display window.

Further, even when information is shared with other persons by using a shared area on an electronic whiteboard, it is also important to set (or define) access rights in such a manner that individuals who can access the shared information (e.g., members) are separated from individuals who cannot access the shared information (e.g., guests). For such a mechanism for setting access rights, Japanese Patent No. 5369800, for example, proposes a technique related to "Information Processing System, Information Processing Method, and Information Processing Apparatus".

Japanese Patent No. 5369800 proposes the following mechanism. As access rights for a virtual working space where a plurality of users can simultaneously work, users are divided into members and guests. While a member can unconditionally access the virtual working space, a guest can reflect (i.e., present or change) an object created by himself/herself in an area for the guest only when an administrator selects an acceptance button. When the administrator selects a delete button, the object created by the guest is deleted from the working area where the object is temporarily stored.

Problem in Related Art

However, there is a problem in the technique disclosed in Japanese Unexamined Patent Application Publication No. 2003-281101 that although an electronic whiteboard can be divided into a plurality of areas, access control cannot be performed for each of the divided areas in a detailed manner. Further, there is the following problem in the technique in which a user expands his/her area on an electronic whiteboard. In the related art, since the expansion of an area is performed in a state where the other areas are locked, other users cannot use the electronic whiteboard during the expanding process.

In the technique disclosed in Japanese Patent No. 5369800, for an operation performed by a guest whose access right for the virtual working space (electronic whiteboard) is restricted, the guest cannot reflect his/her operation in the virtual working space (electronic whiteboard) unless the administrator accepts the operation, thus causing a problem that the workability of the guest is extremely poor and the working efficiency deteriorates. Further, there is another problem that no access restriction can be set (i.e., defined) on the drawing of an object in the virtual working space (electronic whiteboard). Furthermore, there is another problem that a user cannot share information by arbitrarily expanding a drawing area on the virtual working space (electronic whiteboard) and freely arranging objects in the drawing area.

SUMMARY

The present invention has been made in view of the above-described problems and an object thereof is to provide an electronic whiteboard system, an electronic whiteboard access right giving method, and an electronic whiteboard access right giving program capable of flexibly giving an access right to each area on an electronic whiteboard that can be divided into a plurality of areas.

To solve the above-described problems, an electronic whiteboard system, an electronic whiteboard access right giving method, and an electronic whiteboard access right giving program according to the present invention mainly adopt the following characteristic configuration.

(1) An electronic whiteboard system according to an aspect of the present invention includes:
  a server device including:
    means for dividing an electronic whiteboard into a plurality of areas; means for storing electronic whiteboard data related to the electronic whiteboard, area data related to the areas, and object data related to an object disposed in the areas;
    means for giving an access right for the electronic whiteboard; and
    means for performing data communication with a client terminal used by a user; and
  the client terminal including:
    means for performing data communication with the server device;
    means for entering or editing the electronic whiteboard data, the area data, and the object data, and transmitting the entered or edited data to the server device; and
    means for acquiring the electronic whiteboard data, the area data, and the object data from the server device, converting the acquired data into drawing data, and displaying the drawing data, in which
  the server device further includes, as the means for giving an access right, means for giving an access right for each user on an area-by-area basis by using the areas obtained by dividing the electronic whiteboard.

(2) An electronic whiteboard access right giving method according to an aspect of the present invention is an electronic whiteboard access right giving method performed in an electronic whiteboard system, including:
  performing, by a server device,
    a step of dividing an electronic whiteboard into a plurality of areas;
    a step of storing electronic whiteboard related to the electronic whiteboard, and area data related to the areas, and object data related to an object disposed in the areas;
    a step of giving an access right for the electronic whiteboard; and a step of performing data communication with a client terminal used by a user; and
  performing, by a client terminal,
    a step of performing data communication with the server device;
    a step of entering or editing the electronic whiteboard data, the area data, and the object data, and transmitting the entered or edited data to the server device; and
    a step of acquiring the electronic whiteboard data, the area data, and the object data from the server device, converting the acquired data into drawing data, and displaying the drawing data, in which
  the electronic whiteboard access right giving method further includes performing, by the server device, a step of giving an access right for each user on an area-by-area basis by using the areas obtained by dividing the electronic whiteboard.

(3) An electronic whiteboard access right giving program according to an aspect of the present invention is characterized in that the electronic whiteboard access right giving method described in the above-shown item (2) is implemented as a computer executable program.

BRIEF DESCRIPTION OF THE DRAWINGS

The above and other objects, features and advantages of the present invention will become more fully understood from the detailed description given hereinbelow and the accompanying drawings which are given by way of illustration only, and thus are not to be considered as limiting the present invention.

FIG. 3 is a table showing an example of an area data setting table for an electronic whiteboard disposed in a storage device of the server device shown in FIG. 1;

FIG. 4 is a table showing an example of an access right data setting table for the electronic whiteboard disposed in the storage device of the server device shown in FIG. 1;

FIG. 10A is a schematic diagram showing an example of drawing data displayed on the screen of the output device of the client terminal shown in FIG. 1 before and after an area expanding process;

FIG. 10B is a schematic diagram showing an example of drawing data displayed on the screen of the output device of the client terminal shown in FIG. 1 before and after an area expanding process;

FIG. 10C is a schematic diagram showing an example of drawing data displayed on the screen of the output device of the client terminal shown in FIG. 1 before and after an area expanding process;

FIG. 11 is a table showing an example of a second exemplary embodiment of the access right data setting table for the electronic whiteboard disposed in the storage device of the server device shown in FIG. 1;

FIG. 13 is a flowchart for explaining an example of a third exemplary embodiment of an operation that is performed when the SV data control unit of the server device shown in FIG. 1 receives an electronic whiteboard access request from a user.

EXEMPLARY EMBODIMENT

Figure 1:
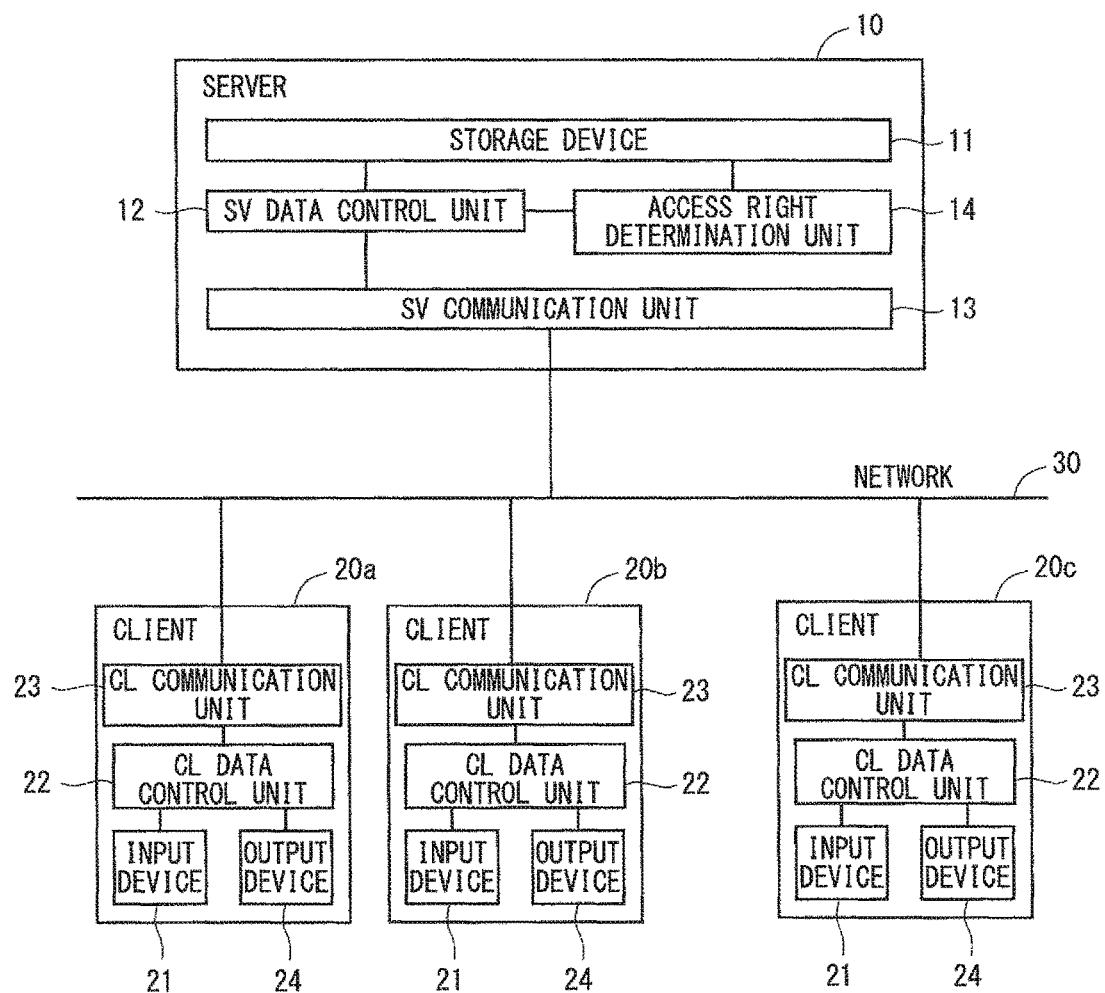
FIG. 1 is a system configuration diagram showing an example of a system configuration in a first exemplary embodiment of an electronic whiteboard according to the present invention.

Preferable exemplary embodiments of an electronic whiteboard system, an electronic whiteboard access right giving method, and an electronic whiteboard access right giving program according to the present invention are explained hereinafter with reference to the attached drawings. Note that in the following explanation, an electronic whiteboard system and an electronic whiteboard access right giving method according to the present invention are explained. However, needless to say, the electronic whiteboard access right giving method may be implemented as an electronic whiteboard access right giving program that can be executed by a computer. Alternatively, the electronic whiteboard access right giving program may be recorded in a computer readable recording medium. Further, reference symbols added in each of the drawings are added for respective components for the sake of convenience as examples for assisting the understanding thereof. That is, needless to say, they are not added with the intension of limiting the present invention to the embodiments shown in the drawings.

Feature of the Present Invention

Before explaining exemplary embodiments according to the present invention, the general outlines of the features of the present invention are explained hereinafter. One of the main features of the present invention lies in that in an electronic whiteboard divided into a plurality of areas, access control is performed for each area and for each user, and an access restriction is set in such a manner that each user can display data, edit data, and expand/reduce an area only for an area(s) for which the user has an access right among the plurality of areas on the electronic whiteboard.

More specifically, one of main features of the present invention lies in that the present invention realizes the following mechanism. An electronic whiteboard according to the present invention is a system including a server device that stores electronic whiteboard data/area data/object data and performs data communication with a client terminal, and the client terminal that displays/enters the electronic whiteboard data/object data and performs data communication with the server device, in which: the server device can connect with a plurality of client terminals and has at least a function of enabling the plurality of client terminals to simultaneously operate a common electronic whiteboard and a function of dividing the electronic whiteboard into a plurality of areas;

the server device further has a function of recognizing a client terminal that is operated by a user (user A) having an access right for the electronic whiteboard and a client terminal that is operated by a user (user B) having no access right for the electronic whiteboard, and enabling the user A to give an access right for a specific area to the user B in the electronic whiteboard divided into the plurality of areas.

The server device further has a function of determining, when the user B accesses the electronic whiteboard including a specific area for which an access right is given to the user B, whether or not an access right is given to the user B for each area of the divided electronic whiteboard, and transmitting, when the access right is given to the user B, the position and the size of the area for which the access right is given to the user B, and information of an object disposed in the area for which the access right is given to the user B to the client terminal of the user B.

Further, another one of the main features of the present invention is that: the client terminal of the user B displays only the specific area for which the access right is given to the user B and the object disposed in the specific area; a result of an operation in which the user B creates and/or edits an object in the area for which the access right is given to the user B is transmitted to the server device and the operation result is stored in the server device; and the operation result is transmitted to, among other users who are accessing the electronic whiteboard, another user(s) who has an access right for the operation result. Note that any operation performed by the user B for an area other than the area for which the access right is given to the user B is invalidated.

Further, another one of the features is that: a result of an operation in which the user B expands/reduces a specific area is transmitted to the server device and the operation result is stored in the server device; and the operation result is transmitted to another user(s) who is accessing the electronic whiteboard.

Further, another one of the features is that: a result of an operation in which the user A creates an object and/or edits an object in an area for which the user A gives an access right to the user B is transmitted to the server device and the operation result is stored in the server device; and the operation result is transmitted to, among other users who are accessing the electronic whiteboard, another user(s) who has an access right for the operation result.

Further, another one of the features is that: a result of an operation in which the user A expands/reduces a divided area is transmitted to the server device and the operation result is stored in the server device; and the operation result is transmitted to another user(s) who is accessing the electronic whiteboard.

Further, another one of the features is that: a result of an operation in which the user A creates an object, edits an object, and/or manipulates an area in an area other than the area for which the user A gives an access right to the user B is transmitted to the server device and the operation result is stored in the server device; and the operation result is transmitted to another user(s) A who is accessing the electronic whiteboard but is not transmitted to the user B.

Configuration Example of First Exemplary Embodiment

Next, an example of a system configuration of an electronic whiteboard according to the present invention is explained with reference to FIG. 1. FIG. 1 is a system configuration diagram showing an example of a system configuration in a first exemplary embodiment of an electronic whiteboard according to the present invention. The electronic whiteboard shown in FIG. 1 is formed by connecting a server device 10 with a plurality of client terminals 20a, 20b, . . . , and 20 c (hereinafter collectively called a "client terminal 20") through a network 30.

The server device (SV: Server) 10 is an apparatus that stores electronic whiteboard data, area data, access right data, object data and so on, and controls data communication. The server device 10 includes, at least, a storage device 11, an SV data control unit 12, an SV communication unit 13, and an access right determination unit 14. Meanwhile, the client terminal (CL: Client) 20 is a terminal that displays and edits electronic whiteboard data, area data, access right data, object data and so on, and performs data communication with the server device 10. The client terminal 20 includes, at least, an input device 21, a CL data control unit 22, a CL communication unit 23, and an output device 24.

Firstly, each part in the server device 10 is explained. The storage device 11 stores, at least, information items such as electronic whiteboard data related to each electronic whiteboard, data of a plurality of objects drawn in an electronic whiteboard, area data of a divided electronic whiteboard, and user access right data for an electronic whiteboard.

The SV data control unit 12 receives a data acquisition request transmitted from the client terminal 20 and information about the creation of an object, the edit of an object, an expanding/reducing operation of an area, and so on through the SV communication unit 13, and controls an operation according to the received request or information. The SV data control unit 12 receives information about whether or not a user of the client terminal 20 has an access right for an operation from the access right determination unit 14, stores operation information into the storage device 11 according to whether the user has the access right or not, and sends a telegram to the SV communication unit 13 in order to transmit it to the client terminal 20.

The SV communication unit 13 receives data that is transmitted from the client terminal 20 through the network 30, and sends the received data to the access right determination unit 14 and the SV data control unit 12. Further, the SV communication unit 13 transmits data that is sent from the SV data control unit 12 to the client terminal 20 through the network 30.

The access right determination unit 14 receives a user ID, an area to be operated, and user operation information from the SV data control unit 12, determines whether the user has an access right or not, and sends the determination result to the SV data control unit 12.

Figure 2:
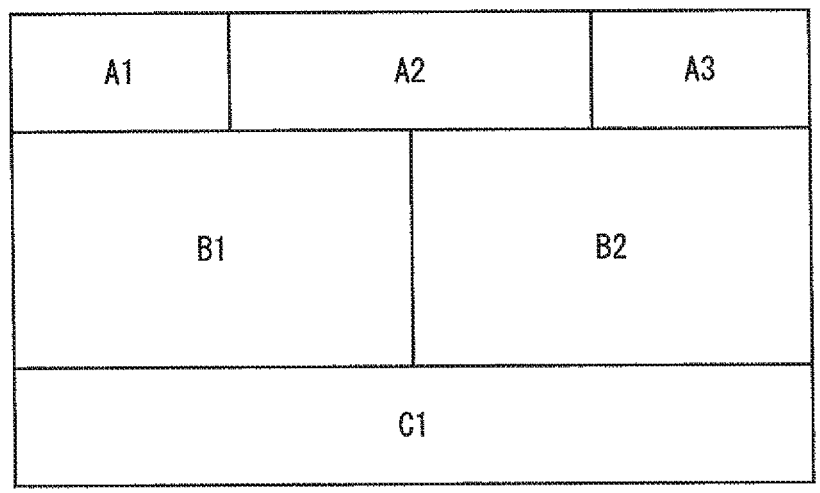
FIG. 2 is a schematic diagram showing a division example in which an electronic whiteboard disposed in a storage device of the server device shown in FIG. 1 is divided into a plurality of areas.

Note that as shown in FIG. 2, an electronic whiteboard can be divided in the horizontal direction. Further, each of the areas that are obtained by dividing the electronic whiteboard in the horizontal direction can be further divided in the vertical direction. FIG. 2 is a schematic diagram showing a division example in which an electronic whiteboard disposed in the storage device 11 of the server device 10 shown in FIG. 1 is divided into a plurality of areas. In the division example shown in FIG. 2, the electronic whiteboard is divided in the horizontal direction into three rows, i.e., an A-row, a B-row, and a C-row. Further, the A-row is divided in the vertical direction into three sections and the B-row is divided in the vertical direction into two sections. Therefore, the electronic whiteboard is divided into six areas in total, i.e., areas A1, A2, A3, B1, B2 and C1.

The area data of the divided electronic whiteboard are set (i.e., recorded) in an area data setting table as shown in FIG. 3 and stored in the storage device 11. FIG. 3 is a table showing an example of the area data setting table for the electronic whiteboard disposed in the storage device 11 of the server device 10 shown in FIG. 1. In the example shown in FIG. 3, each area data set in the area data setting table 100 consists of data of a whiteboard ID 101 indicating an identifier of the electronic whiteboard to which the area belongs, an area ID 102 which is an identifier of the area, an X-coordinate 103 indicating the X-coordinate of the center or the upper-left corner of the area, a Y-coordinate 104, a width 105 indicating the size of the area, and a height 106.

Further, access right data indicating an access right for each area of the divided electronic whiteboard is set (i.e., recorded) in an access right data setting table as shown in FIG. 4 and stored in the storage device 11. FIG. 4 is a table showing an example of the access right data setting table for the electronic whiteboard disposed in the storage device 11 of the server device 10 shown in FIG. 1. In the example shown in FIG. 4, each access right data set in the access right data setting table 110 consists of data of a whiteboard ID 111 indicating an identifier of the electronic whiteboard to which the area belongs, an area ID 112 which is an identifier of the area, and a user ID 113 indicating a user who has an access right for the area.

Figure 5:
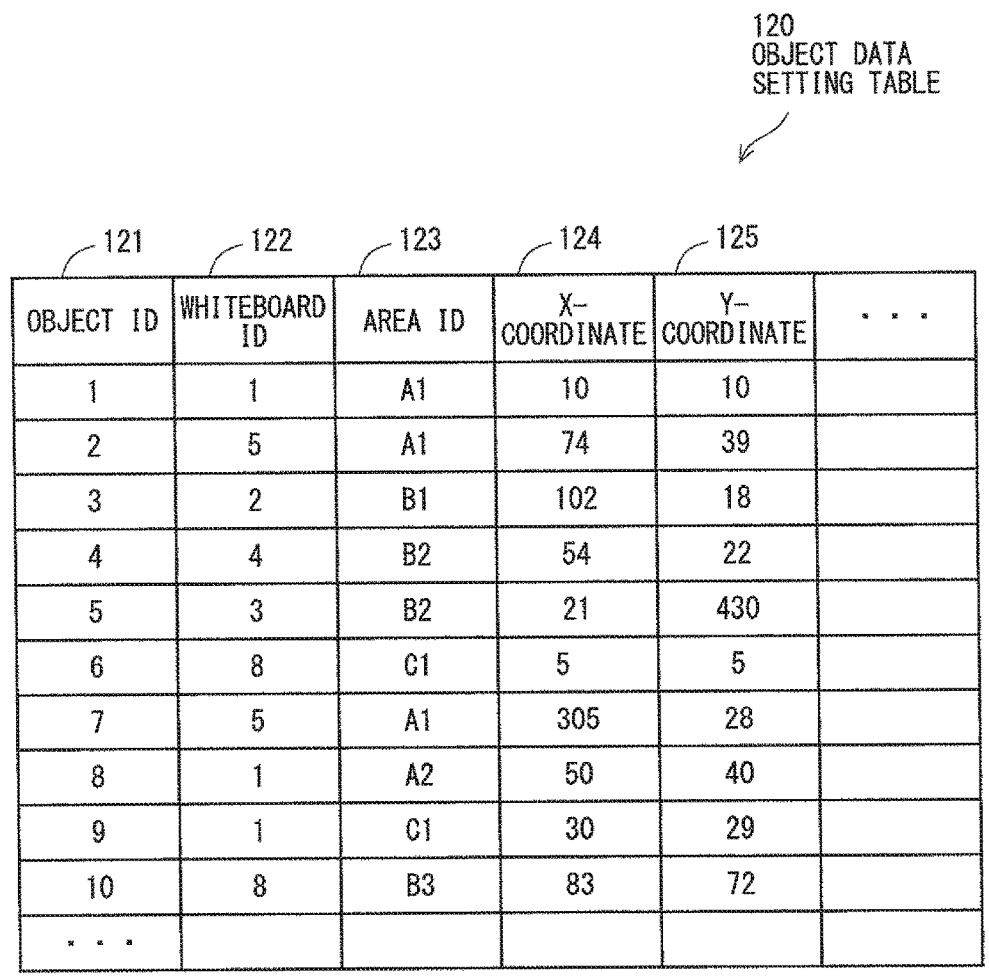
FIG. 5 is a table showing an example of an object data setting table for the electronic whiteboard disposed in the storage device of the server device shown in FIG. 1.

Further, object data for an object disposed in the electronic whiteboard is set (i.e., recorded) in an object data setting table as shown in FIG. 5 and stored in the storage device 11. FIG. 5 is a table showing an example of the object data setting table for the electronic whiteboard disposed in the storage device 11 of the server device 10 shown in FIG. 1. In the example shown in FIG. 5, each object data set in the object data setting table 120 consists of data of an object ID 121 indicating an identifier of the object data, a whiteboard ID 122 indicating an identifier of the electronic whiteboard to which the object belongs, an area ID 123 which is an identifier of the area to which the object belongs, an X-coordinate 124 indicating the X-coordinate of the center or the upper-left corner of the object, a Y-coordinate 125, . . . and so on.

Next, each part in the client terminal 20 is explained. The input device 21 is a pointing device such as a mouse operated by a user, or an input device such as a touch display and a keyboard. The input device 21 is used by a user to perform an operation such as an addition, a movement, a deletion, and the like of an object on the electronic whiteboard.

Further, the CL data control unit 22 sends information entered from the input device 21 to the CL communication unit 23 and instructs the CL communication unit 23 to transmit the information to the server device 10. Further, the CL data control unit 22 receives data, which is received from the server device 10, from the CL communication unit 23 and instructs the output device 24 to draw an image according to the data. Further, when a user enters a search condition (or search terms) and thereby requests a search, the CL data control unit 22 sends the search condition to the CL communication unit and instructs the CL communication unit to transmit the search condition to the server device 10.

Further, the CL communication unit 23 receives data transmitted from the server device 10 and sends the data to the CL data control unit 22. Further, the CL communication unit 23 transmits data received from the CL data control unit 22 to the server device 10. Further, the output device 24 is a display device that displays object information or the like drawn on the electronic whiteboard.

Explanation of Operation According to First Exemplary Embodiment

Next, an operation of the electronic whiteboard shown as the first exemplary embodiment in FIG. 1 is explained in detail.

<Operation Performed when Electronic Whiteboard is Viewed>

Firstly, an operation in which a user (operator) accesses and views (or browses) an electronic whiteboard divided into a plurality of areas is explained.

When a user (operator) performs an operation for opening an electronic whiteboard of the server device 10 by using the input device 21 of the client terminal 20, the CL data control unit 22 of the client terminal 20 creates an electronic whiteboard access request including a user ID indicating the user (operator) and a whiteboard ID indicating the electronic whiteboard that the user is attempting to access and sends the created electronic whiteboard access request to the CL communication unit 23. The CL communication unit 23 transmits the received electronic whiteboard access request to the SV communication unit 13 of the server device 10 through the network 30. Upon receiving the electronic whiteboard access request from the client terminal 20, the SV communication unit 13 of the server device 10 sends the received electronic whiteboard access request to the SV data control unit 12.

Figure 6:
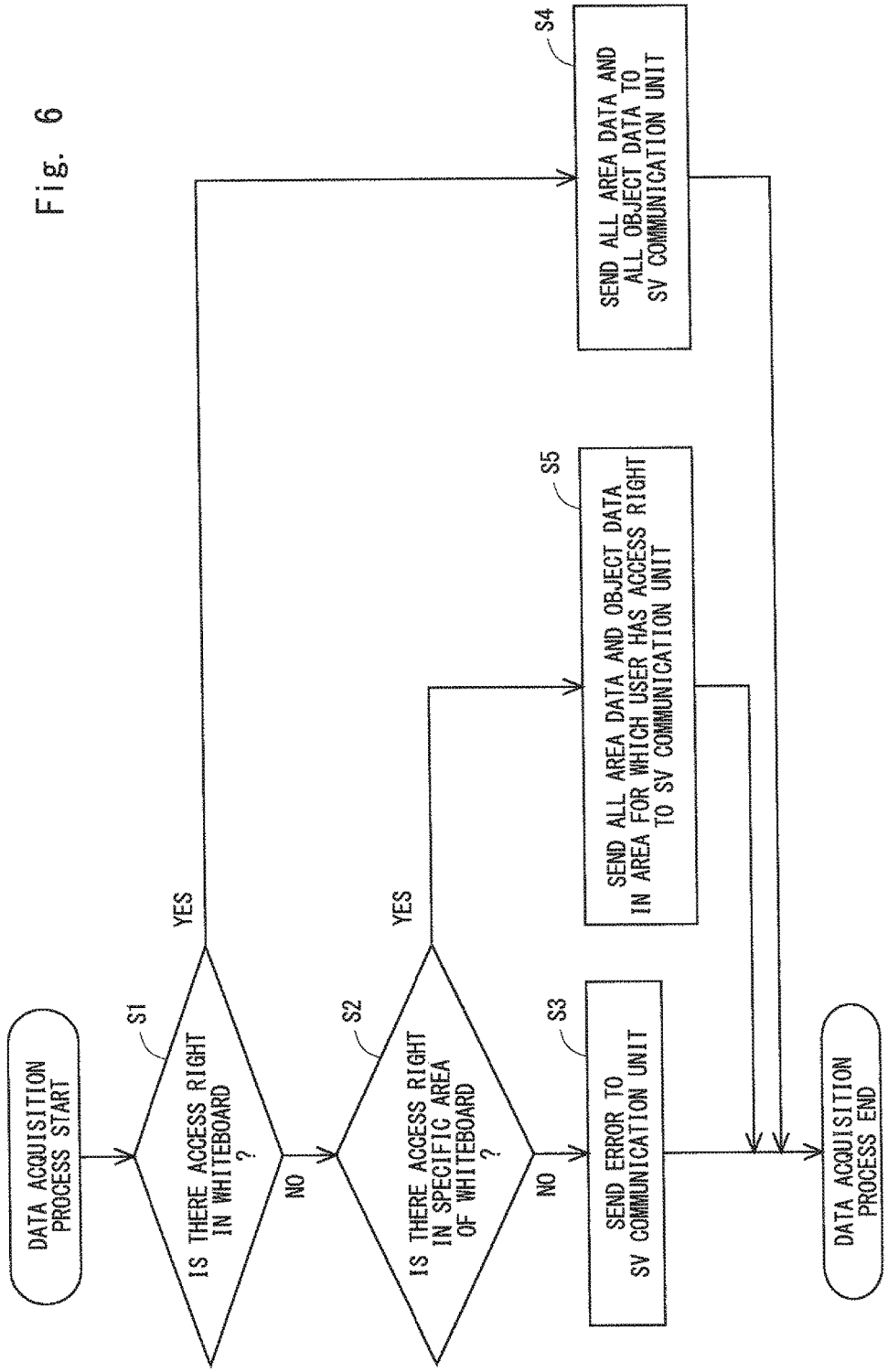
FIG. 6 is a flowchart for explaining an example of an operation that is performed when an SV data control unit of the server device shown in FIG. 1 receives an electronic whiteboard access request from a user.

The subsequent operation performed in the SV data control unit 12 is explained with reference to a flowchart shown in FIG. 6. FIG. 6 is a flowchart for explaining an example of an operation that is performed when the SV data control unit 12 of the server device 10 shown in FIG. 1 receives the electronic whiteboard access request from the user.

In the flowchart shown in FIG. 6, the SV data control unit 12 first refers to the access right data setting table shown in FIG. 4 based on the user ID and the whiteboard ID included in the received electronic whiteboard access request and thereby checks whether or not the user (operator) who has sent the electronic whiteboard access request (hereinafter also referred to as the "transmitting user (operator)") has an access right for the electronic whiteboard indicated by the whiteboard ID (step S1).

When the transmitting user (operator) has an access right for the electronic whiteboard indicated by the whiteboard ID (Yes at step S1), the SV data control unit 12 refers to the area data setting table 100 shown in FIG. 3 and the object data setting table 120 shown in FIG. 5, reads out all the area data of the electronic whiteboard indicated by the whiteboard ID of the electronic whiteboard access request and all the object information thereof from the storage device 11, and sends the read data and information to the SV communication unit 13 in order to transmit them to the client terminal 20 of the user (operator) who has issued the request (hereinafter also referred to as the "requesting user (operator)") (step S4).

On the other hand, when the transmitting user (operator) does not have an access right for the electronic whiteboard indicated by the whiteboard ID (No at step S1), the SV data control unit 12 searches the access right data setting table shown in FIG. 4 by using the user ID and thereby checks whether or not there is an area(s) for which the transmitting user (operator) has an access right among the plurality of areas of the electronic whiteboard indicated by the whiteboard ID (step S2).

When there is an area(s) for which the transmitting user (operator) has an access right (Yes at step S2), the SV data control unit 12 refers to the area data setting table 100 shown in FIG. 3 and the object data setting table 120 shown in FIG. 5, reads out the area data of the electronic whiteboard indicated by the whiteboard ID and the data of objects disposed in all the areas for which the transmitting user (operator) has an access right from the storage device 11, and sends the read data to the SV communication unit 13 in order to transmit them to the client terminal 20 of the requesting user (operator) (step S5).

On the other hand, when there is no area for which the transmitting user (operator) has an access right in the electronic whiteboard indicated by the whiteboard ID (No at step S2), the SV data control unit 12 generates error information and sends the generated error information to the SV communication unit 13 in order to transmit it to the client terminal 20 of the requesting user (operator) (step S3).

When the SV communication unit 13 receives information that should be transmitted to the client terminal 20 of the requesting user (operator) through the above-described operation performed by the SV data control unit 12, the SV communication unit 13 transmits the received information to the CL communication unit 23 of the client terminal 20 of the requesting user (operator) through the network 30.

Upon receiving the information from the server device 10, the CL communication unit 23 of the client terminal 20 sends the received information to the CL data control unit 22. The CL data control unit 22 converts the receiving information into drawing data capable of being displayed in a screen and sends the drawing data to the output device 24. The output device 24 draws the drawing data sent from the CL data control unit 22 on a display, and thereby displays it on the screen and shows it to the user (operator).

Figure 7A:
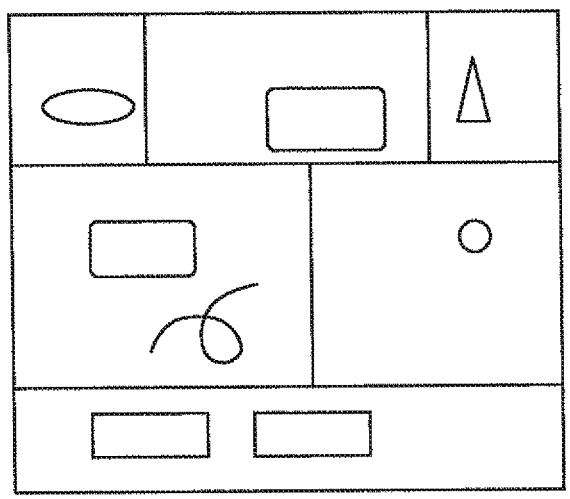
FIG. 7A is a schematic diagram showing an example of drawing data displayed on a screen of an output device of a client terminal shown in FIG. 1.
Figure 7B:
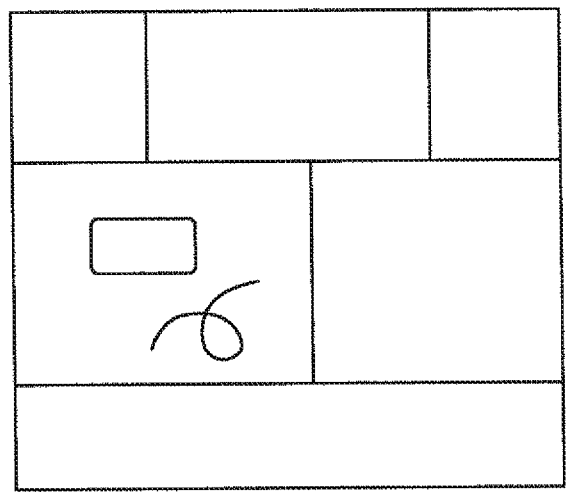
FIG. 7B is a schematic diagram showing an example of drawing data displayed on a screen of an output device of a client terminal shown in FIG. 1.

FIGS. 7A and 7B are schematic diagrams showing examples of drawing data displayed on the screen of the output device 24 of the client terminal 20 shown in FIG. 1. In particular, FIGS. 7A and 7B show examples in which the information transmitted from the server device 10 is converted into drawing data and displayed on the screen in response to the electronic whiteboard access request transmitted from the client terminal 20 to the server device 10.

In the schematic diagrams shown in FIGS. 7A and 7B, FIG. 7A shows an example of display in a case where the user (operator) of the client terminal 20 has an access right for the electronic whiteboard designated by the electronic whiteboard access request transmitted from the client terminal 20, in which the data of all the objects disposed in the electronic whiteboard is displayed on the screen. Further, FIG. 7B shows an example of display in a case where the user (operator) of the client terminal 20 has an access right only for a part of the electronic whiteboard, i.e., a specific area among the plurality of areas of the electronic whiteboard designated by the electronic whiteboard access request transmitted from the client terminal 20, in which the data of only the objects disposed in the specific area on the electronic whiteboard is displayed on the screen.

<Operation Performed when Electronic Whiteboard is Edited>

Next, an operation in which a user (operator) edits an object located in a specific area among a plurality of areas of an electronic whiteboard divided into the plurality of areas is explained.

When a user (operator) performs an operation for editing (moving, size-changing, or the like) an object located in one of the areas of the electronic whiteboard displayed on the screen by using the input device 21 of the client terminal 20, the CL data control unit 22 sends a user ID of the user (operator) who has performed the operation, a whiteboard ID indicating the electronic whiteboard to be operated, an area ID indicating the area to be operated, an object ID indicating the operated (i.e., edited) object, and the details of the operation to the CL communication unit 23 as an electronic whiteboard edit request indicating the edit operation result.

The CL communication unit 23 transmits the received electronic whiteboard edit request to the SV communication unit 13 of the server device 10 through the network 30. Upon receiving the electronic whiteboard edit request from the client terminal 20, the SV communication unit 13 of the server device 10 sends the received electronic whiteboard edit request to the SV data control unit 12.

Figure 8:
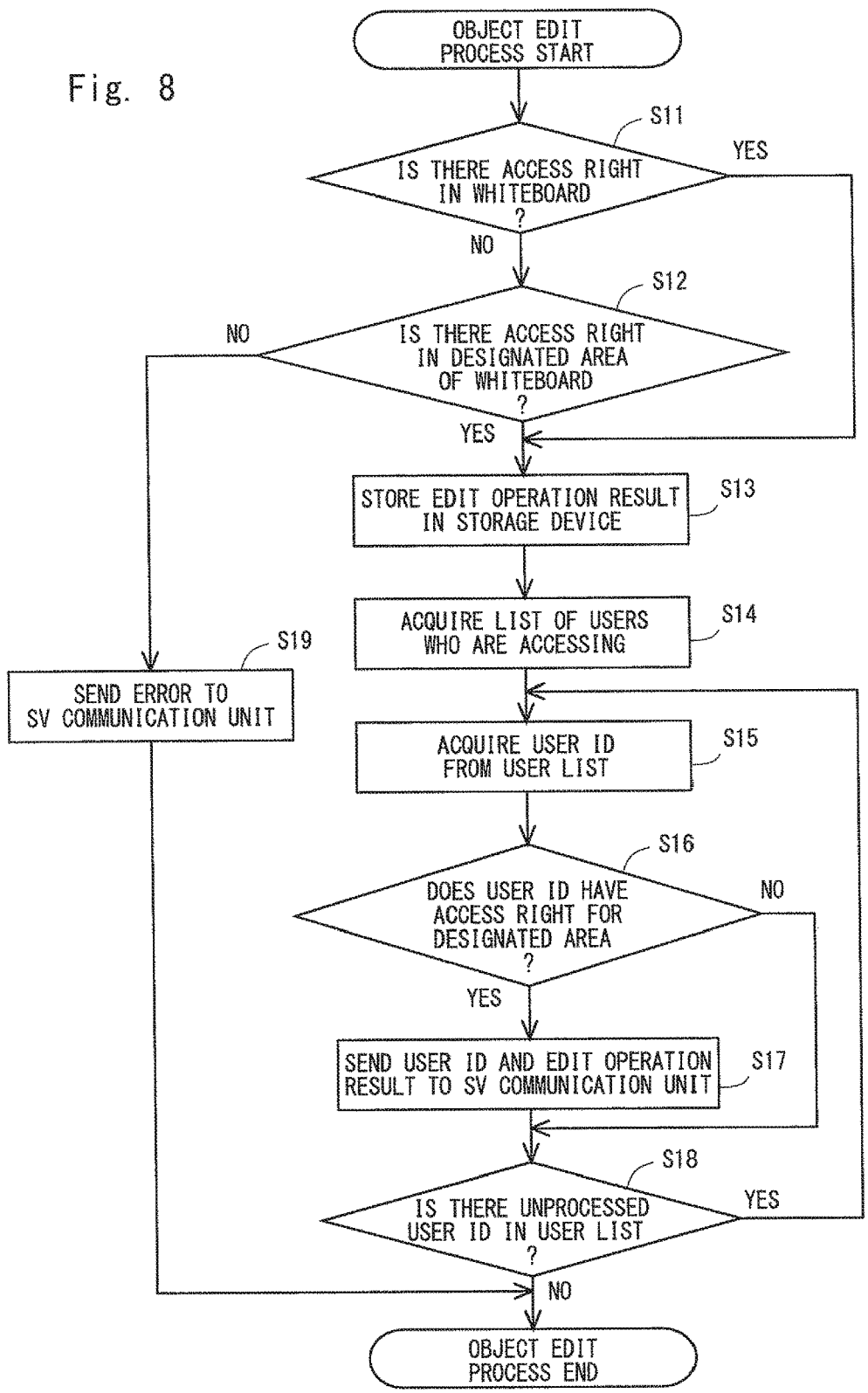
FIG. 8 is a flowchart for explaining an example of an operation that is performed when the SV data control unit of the server device shown in FIG. 1 receives an electronic whiteboard edit request from a user.

The subsequent operation performed in the SV data control unit 12 is explained with reference to a flowchart shown in FIG. 8. FIG. 8 is a flowchart for explaining an example of an operation that is performed when the SV data control unit 12 of the server device 10 shown in FIG. 1 receives the electronic whiteboard edit request from the user.

In the flowchart shown in FIG. 8, the SV data control unit 12 first refers to the access right data setting table shown in FIG. 4 based on the user ID and the whiteboard ID included in the received electronic whiteboard edit request and thereby checks whether or not the user (operator) who has transmitted the electronic whiteboard edit request has an access right for the electronic whiteboard indicated by the whiteboard ID (step S11).

When the transmitting user (operator) has an access right for the electronic whiteboard indicated by the whiteboard ID (Yes at step S11), the SV data control unit 12 proceeds to a process in a step S13. On the other hand, when the transmitting user (operator) does not have an access right for the electronic whiteboard indicated by the whiteboard ID (No at step S11), the SV data control unit 12 refers to the access right data setting table shown in FIG. 4 by using the area ID included in the received electronic whiteboard edit request in addition to the whiteboard ID and thereby checks whether or not the user (operator) who has sent the electronic whiteboard edit request has an access right for the area on the electronic whiteboard indicated by the whiteboard ID and the area ID (step S12).

When the transmitting user (operator) has an access right for the area on the electronic whiteboard indicated by the whiteboard ID and the area ID (Yes at step S12), the SV data control unit 12 proceeds to the process in the step S13. However, when the transmitting user (operator) has no access right for the area on the electronic whiteboard indicated by the whiteboard ID and the area ID (No at step S12), the SV data control unit 12 generates error information and sends the generated error information to the SV communication unit 13 in order to transmit it to the client terminal 20 of the requesting user (operator) (step S19).

When it is confirmed that the transmitting user (operator) has an access right for the electronic whiteboard or the area on the electronic whiteboard that the transmitting user (operator) is attempting to edit and hence the SV data control unit 12 proceeds to the process in the step S13, the SV data control unit 12 refers to the object data setting table 120, reflects the edit operation result indicated by the electronic whiteboard edit request in the corresponding electronic whiteboard or reflects only a part of the edit operation result that is related to the area for which the user (operator) has the access right in that area on the electronic whiteboard, and stores it in the storage device 11 (step S13).

After that, the SV data control unit 12 first acquires a user ID list indicating all the users who are currently accessing the electronic whiteboard in order to reflect the edit operation result for the users who are currently accessing the electronic whiteboard (step S14). The SV data control unit 12 picks up user IDs one by one in an arbitrary order from the acquired user ID list (step S15), and refers to the access right data setting table shown in FIG. 4 based on the picked user ID and thereby checks whether or not the user indicated by the user ID has an access right for the area on the electronic whiteboard in which the edit operation result is to be reflected (step S16).

When the user indicated by the picked user ID has an access right for the area on the electronic whiteboard (Yes at step S16), the SV data control unit 12 sends the picked user ID and the edit operation result to the SV communication unit 13 (step S17).

Next, the SV data control unit 12 checks whether or not there is a user ID in the user ID list for which the processes in the steps S16 and S17 have not been performed yet (step S18). Then, when there is an unprocessed user ID (Yes at step S18), the SV data control unit 12 returns to the step S15 and proceeds to the process for picking up the next user ID. On the other hand, when the processes have been completed for all the user IDs in the user ID list (No at step S18), the SV data control unit 12 finishes the process.

Note that in the step S17, the SV communication unit 13, which has received the user ID and the edit operation result from the SV data control unit 12, transmits the edit operation result to the CL communication unit 23 of the client terminal 20 indicated by the user ID through the network 30. When the CL communication unit 23 of the client terminal 20 sends the edit operation result received from the SV communication unit 13 of the server device 10 to the CL data control unit 22, the CL data control unit 22 generates drawing data in which the edit operation result is reflected and sends the generated drawing data to the output device 24. As a result, the drawing data in which the edit operation result is reflected is displayed on the screen and shown to the corresponding user.

<Operation Performed when Area in Electronic Whiteboard is Expanded>

Next, an operation in which a user (operator) performs a process for expanding a specific area among a plurality of areas of an electronic whiteboard divided into the plurality of areas is explained. Note that although an operation in which a process for expanding a specific area is explained in the following explanation, a completely similar operation may be performed when a specific area is reduced.

When a user (operator) performs an operation for expanding one of the areas of an electronic whiteboard displayed on a screen by using the input device 21 of the client terminal 20, the CL data control unit 22 sends a user ID of the user (operator) who has performed the operation, a whiteboard ID indicating the electronic whiteboard to which the area to be expanded belongs, an area ID indicating the area to be expanded, the details of the operation of the expanding process to the CL communication unit 23 as an electronic whiteboard area expanding process request indicating the area expanding operation result.

The CL communication unit 23 transmits the received electronic whiteboard area expanding process request to the SV communication unit 13 of the server device 10 through the network 30. Upon receiving the electronic whiteboard area expanding process request from the client terminal 20, the SV communication unit 13 of the server device 10 sends the received electronic whiteboard area expanding process request to the SV data control unit 12.

Figure 9:
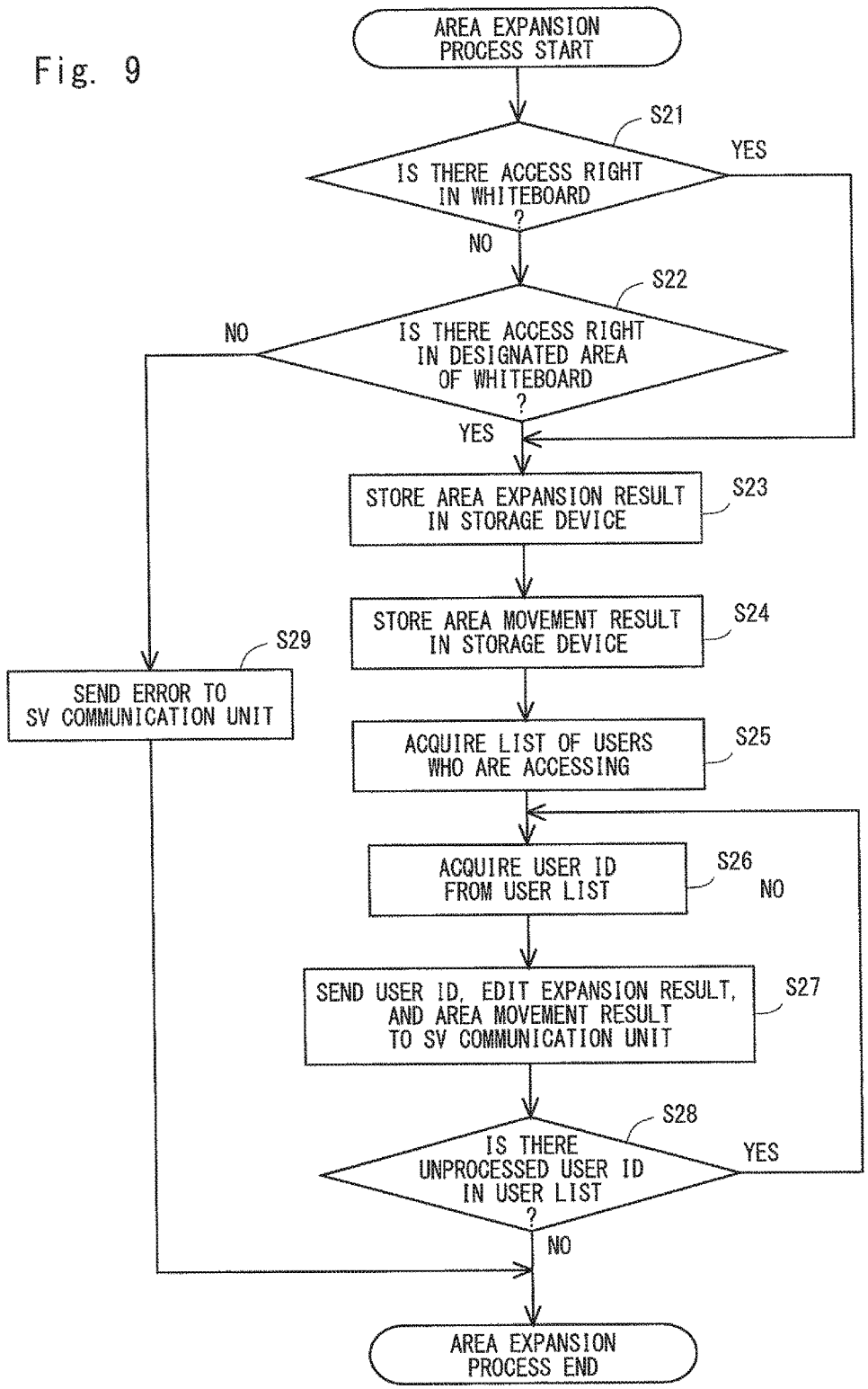
FIG. 9 is a flowchart for explaining an example of an operation that is performed when the SV data control unit of the server device shown in FIG. 1 receives an electronic whiteboard area expansion request from a user.

The subsequent operation performed in the SV data control unit 12 is explained with reference to a flowchart shown in FIG. 9. FIG. 9 is a flowchart for explaining an example of an operation that is performed when the SV data control unit 12 of the server device 10 shown in FIG. 1 receives an electronic whiteboard area expanding process request from a user.

In the flowchart shown in FIG. 9, the SV data control unit 12 performs a process for checking an access right in a manner similar to that in the flowchart shown in FIG. 8. That is, the SV data control unit 12 first refers to the access right data setting table shown in FIG. 4 based on the user ID and the whiteboard ID included in the received electronic whiteboard area expanding process request and thereby checks whether or not the user (operator) who has transmitted the electronic whiteboard area expanding process request has an access right for the electronic whiteboard indicated by the whiteboard ID (step S21).

When the transmitting user (operator) has an access right for the electronic whiteboard indicated by the whiteboard ID (Yes at step S21), the SV data control unit 12 proceeds to a process in a step S23. On the other hand, when the transmitting user (operator) does not have an access right for the electronic whiteboard indicated by the whiteboard ID (No at step S21), the SV data control unit 12 refers to the access right data setting table shown in FIG. 4 by using the area ID included in the received electronic whiteboard area expanding process request in addition to the whiteboard ID and thereby checks whether or not the user (operator) who has sent the electronic whiteboard area expanding process request has an access right for the area on the electronic whiteboard indicated by the whiteboard ID and the area ID (step S22).

When the transmitting user (operator) has an access right for the area on the electronic whiteboard indicated by the whiteboard ID and the area ID (Yes at step S22), the SV data control unit 12 proceeds to the process in the step S23. However, when the transmitting user (operator) has no access right for the area on the electronic whiteboard indicated by the whiteboard ID and the area ID (No at step S22), the SV data control unit 12 generates error information and sends the generated error information to the SV communication unit 13 in order to transmit it to the client terminal 20 of the requesting user (operator) (step S29).

When it is confirmed that the transmitting user (operator) has an access right for the electronic whiteboard or the area on the electronic whiteboard that the transmitting user (operator) is attempting to perform the area expanding process and hence the SV data control unit 12 proceeds to the process in the step S23, the SV data control unit 12 reflects the area expanding operation result indicated by the electronic whiteboard area expanding process request in the area in the corresponding electronic whiteboard and in the size and the position of an object by referring to the area data setting table 100 shown in FIG. 3 and the object data setting table 120 shown in FIG. 5, updates the contents set (i.e., recorded) in the area data setting table 100 and the object data setting table 120, and stores them in the storage device 11 as the area expanding operation result (step S23). Further, the SV data control unit 12 moves the position of each of the areas that are located on, for example, the right side and the lower side of the area for which the expanding process is performed in the expanding direction, e.g., in the right direction and the downward direction by a moving amount corresponding to the magnitude of the expansion by which the area for which the expanding process is performed is expanded, updates the contents set (i.e., recorded) in the area data setting table 100 and the object data setting table 120, and stores them in the storage device 11 as the area moving process result (step S24).

After that, the SV data control unit 12 first acquires a user ID list indicating all the users who are currently accessing the electronic whiteboard in order to reflect the area expanding operation result and the area moving process result for the users who are currently accessing the electronic whiteboard (step S25). The SV data control unit 12 picks up user IDs one by one in an arbitrary order from the user ID list (step S26) and sends the picked user ID, and the area expanding operation result and the area moving process result to the SV communication unit 13 (step S27).

Next, the SV data control unit 12 checks whether or not there is a user ID in the user ID list for which the processes in the step S27 have not been performed yet (step S28). Then, when there is an unprocessed user ID (Yes at step S28), the SV data control unit 12 returns to the step S25 and proceeds to the process for picking up the next user ID. On the other hand, when the processes have been completed for all the user IDs in the user ID list (No at step S28), the SV data control unit 12 finishes the process.

Note that in the step S27, the SV communication unit 13, which has received the user ID and the area expanding operation result and the area moving process result from the SV data control unit 12, transmits the area expanding operation result and the area moving process result to the CL communication unit 23 of the client terminal 20 indicated by the user ID through the network 30. When the CL communication unit 23 of the client terminal 20 sends the area expanding operation result and the area moving process result received from the SV communication unit 13 of the server device 10 to the CL data control unit 22, the CL data control unit 22 generates drawing data in which the area expanding operation result and the area moving process result is reflected and sends the generated drawing data to the output device 24. As a result, the drawing data in which the area expanding operation result and the area moving process result is reflected is displayed on the screen and shown to the corresponding user.

FIGS. 10A, 10B and 10C are schematic diagrams showing examples of drawing data displayed on the screen of the output device 24 of the client terminal 20 shown in FIG. 1 before and after the area expanding process. In particular, FIGS. 10A, 10B and 10C show examples in which drawing data in which the area expanding operation result and the area moving process result transmitted from the server device 10 to the client terminal 20 of each user who is accessing the corresponding electronic whiteboard is reflected in response to the electronic whiteboard area expanding process request transmitted from the client terminal 20 to the server device 10 is displayed on the screen.

In the schematic diagrams shown in FIGS. 10A, 10B and 10C, the upper part show screens before the area expanding process. Further, the lower part show screens after the area expanding process through which specific areas 130 are expanded downward as indicated by arrows shown in the upper part. FIG. 10A shows an example of display on the screen in a case where the user of the client terminal 20 has an access right for the electronic whiteboard designated by the electronic whiteboard area expanding process request, in which all the objects disposed in the electronic whiteboard are displayed on the screen before and after the area expanding process. As shown in the lower part of FIG. 10A, an area 131, which is located below the designated specific area 130, is also moved downward according to the magnitude of the expansion by which the designated specific area 130 is expanded downward.

Further, FIG. 10B shows an example of display on the screen in a case where the user of the client terminal 20 has an access right only for the specific area 130 designated by the electronic whiteboard area expanding process request, in which only the objects disposed in the specific area 130 are displayed on the screen before and after the area expanding process and the objects disposed in the other areas of the electronic whiteboard are not displayed on the screen. As shown in the lower part of FIG. 10B, an area 131, which is located below the designated specific area 130, is also moved downward according to the magnitude of the expansion by which the designated specific area 130 is expanded downward, though no object is displayed in the area 131.

Further, FIG. 10C shows an example of display on the screen in a case where the user of the client terminal 20 has an access right only for the area located below the specific area 130 designated by the electronic whiteboard area expanding process request, in which only the objects disposed in the area located below the specific area 130 are displayed on the screen before and after the area expanding process and the objects disposed in the other areas of the electronic whiteboard are not displayed on the screen. As shown in the lower part of FIG. 10C, the area 131, which is located below the designated specific area 130, is also moved downward according to the magnitude of the expansion by which the designated specific area 130 is expanded downward, though no object is displayed in the specific area 130.

The mechanism according to the first exemplary embodiment, which has been explained above, can also be suitably applied to the following specific examples.

For example, assuming a case where the administrator of an electronic whiteboard divides the electronic whiteboard into a plurality of areas and uses one of the areas for organizing materials for a meeting and another area for personal memos or the like, the administrator can hold a meeting with another user(s) by setting the electronic whiteboard so that only the area where the materials for the meeting are organized is shared with the other user(s).

Alternatively, assume a case where the administrator of an electronic whiteboard divides the electronic whiteboard into a plurality of areas and organizes a proposal for a company A, a proposal for a company B, and a proposal for a company C in their respective areas. When the administrator shares information with the company A by using the electronic whiteboard, the administrator can give an access right only for the area where the proposal for the company A is written to users of the company A so that the users of the company A cannot view (or browse) the proposals for the companies B and C.

Alternatively, assume a case where the administrator of an electronic whiteboard gives an assignment to each of parsons A, B and C, and divides the electronic whiteboard into a plurality of areas and gives access rights to the persons A, B and C for their respective areas. The administrator can configure the electronic whiteboard so that each of the persons A, B and C can write his/her answer in his/her own designated area but cannot peep into the answers of the other persons. Meanwhile, the administrator of the electronic whiteboard can display and view the answer of each user (i.e., each of the persons A, B and C) in real time and hence can grasp the progress of each user at a glance.

Explanation of Advantageous Effect of First Exemplary Embodiment

As explained above in detail, the first exemplary embodiment provides the following advantageous effects.

Firstly, in an electronic whiteboard divided into a plurality of areas, an access right can be set (or defined) on a user-by-user basis and on an area-by-area basis. Therefore, an access right can be flexibly given to each area on the electronic whiteboard and a specific area on the electronic whiteboard can be effectively used as an area for sharing information with another user(s).

Secondly, when an edit process or an area expanding/reducing process is performed in an area for sharing information with another user(s) in an electronic whiteboard divided into a plurality of areas, the edit process result or the area expanding/reducing process result are transmitted to the client device of another user(s) who is accessing that area, thus making it possible to display the electronic whiteboard in which the edit process result or the area expanding/reducing process result are reflected on the screen of the client device. As a result, it is possible to maintain the information sharing state without being interrupted.

Thirdly, when an area expanding/reducing process is performed in an electronic whiteboard that is divided into a plurality of areas and includes an area for sharing information with another user(s), there is no need to perform a locking process such as a process for preventing any access to areas on the electronic whiteboard other than the specific area for which the area expanding/reducing process is performed, thus causing no harmful effects on other users. Therefore, it is possible to perform an area expanding/reducing process at an arbitrary timing, regardless of whether the performed process is an area expanding process or an area reducing process.

Fourthly, when an area expanding/reducing process is performed in an electronic whiteboard that is divided into a plurality of areas and includes an area for sharing information with another user(s), another area(s) located in the expanding/reducing direction with respect to the specific area for which the area expanding/reducing process is performed is moved according to the magnitude of the expansion/reduction of the specific area. Therefore, even when the specific area is an area for sharing information, such a situation that information in the other area(s) located in the expanding/reducing direction with respect to the specific area inadvertently changes into shared information never occurs.

Second Exemplary Embodiment

Next, as a second exemplary embodiment according to the present invention, a case where, as for the access right data indicating an access right for each area on an electronic whiteboard, an access right is set (i.e., defined) for each area on the electronic whiteboard in a more detailed manner than that in the first exemplary embodiment is explained. That is, a case where in contrast to the access right data setting table 110 according to the first exemplary embodiment shown in FIG. 4, an access right is set (i.e., defined) for each area in a more detailed manner so that the administrator administrating the electronic whiteboard can control access for an area(s) that is desired to be shared on the electronic whiteboard with another user(s) in a more detailed manner. Here, as detailed attributes of an access right, it is possible to designate (or define), for example, a displaying right, an object creating right, an object edit right, an object delete right, an area expansion right, and an area expansion available quantity indicating the maximum factor by which the original area can be expanded. Note that the system configuration of the electronic whiteboard system according to the second exemplary embodiment is identical to that of the first exemplary embodiment shown in FIG. 1.

In the second exemplary embodiment, access right data indicating an access right for each area on the electronic whiteboard is set (i.e., recorded) in an access right data setting table shown in FIG. 11, instead of being set in the table of the first exemplary embodiment shown in FIG. 4, and is stored in the storage device 11. The validity/invalidity of an operation performed by a user is determined according to access right data set in an access right data setting table 110A shown in FIG. 11.

FIG. 11 is a table showing an example of the second exemplary embodiment of the access right data setting table for the electronic whiteboard disposed in the storage device 11 of the server device 10 shown in FIG. 1. The structure example of the access right data setting table 110A shown in FIG. 11 consists of data obtained by adding additional access right attributes 114 indicating an attribute of an access right in the data set in the access right data setting table 110 shown in FIG. 4 (consisting of the whiteboard ID 111 indicating an identifier of the electronic whiteboard to which the area belongs, the area ID 112 which is an identifier of the area, and the user ID 113 indicating a user who has an access right for the area). Note that as described above, an example where a displaying right, an object creating right, an object edit right, an object delete right, an area expansion right, and an area expansion available quantity indicating the maximum factor by which the original area can be expanded are set (i.e., defined) is shown as the access right attributes 114 in the access right data setting table 110A shown in FIG. 11.

Third Exemplary Embodiment

Next, as a third exemplary embodiment according to the present invention, a case where, as for the access right data indicating an access right for each area on an electronic whiteboard, an access unavailable right is given as a type of an access right for each area so that the administrator of the electronic whiteboard can set only a specific area on the electronic whiteboard to an access unavailable state is explained as another example different from the access right data setting table 110A shown as the second exemplary embodiment in FIG. 1. Note that the system configuration of the electronic whiteboard system according to the third exemplary embodiment is identical to that of the first exemplary embodiment shown in FIG. 1.

Figure 12:
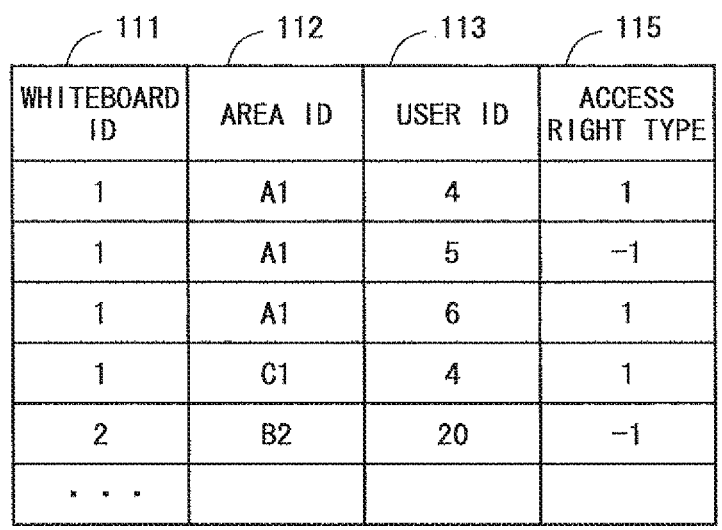
FIG. 12 is a table showing an example of a third exemplary embodiment of the access right data setting table for the electronic whiteboard disposed in the storage device of the server device shown in FIG. 1.

As access right data in the third exemplary embodiment, access right data indicating an access right for each area on the electronic whiteboard is set (i.e., recorded) in an access right data setting table 110B as shown in FIG. 12, instead of or in addition to being set in the access right data setting table 110 or 110A according to the first or second exemplary embodiment shown in FIG. 4 or 11, respectively, and is stored in the storage device 11. The validity/invalidity of an operation performed by a user is determined according to access right data set in an access right data setting table 110B shown in FIG. 12.

FIG. 12 is a table showing an example of the third exemplary embodiment of the access right data setting table for the electronic whiteboard disposed in the storage device 11 of the server device 10 shown in FIG. 1. The structure example of the access right data setting table 110B shown in FIG. 12 consists of data obtained by adding an additional access right type 115 indicating a type of an access right in the data set in the access right data setting table 110 shown in FIG. 4. Note that an example where, for example, "1" is set (or defined) as "access available" and "−1" is set as "access unavailable" is shown as the access right type 115 in the access right data setting table 110B shown in FIG. 12.

Next, an operation of the SV data control unit 12 performed when the access right data setting table 110B according to the third exemplary embodiment shown in FIG. 12 is stored in the storage device 11 is explained with reference to a flowchart show in FIG. 13 by using an example where a user (operator) accesses and views (or browses) an electronic whiteboard divided into a plurality of areas. FIG. 13 is a flowchart for explaining an example of the third exemplary embodiment of an operation that is performed when the SV data control unit 12 of the server device 10 shown in FIG. 1 receives an electronic whiteboard access request from a user. Note that as explained above in the first exemplary embodiment, when a user (operator) performs an operation for opening an electronic whiteboard of the server device 10 by using the input device 21 of the client terminal 20, an electronic whiteboard access request is transmitted from the client terminal 20 to the SV data control unit 12 of the server device 10.

In the flowchart shown in FIG. 13, the SV data control unit 12 first refers to the access right data setting table shown in FIG. 12 based on the user ID and the whiteboard ID included in the received electronic whiteboard access request and thereby checks whether or not the user (operator) who has sent the electronic whiteboard access request (hereinafter also referred to as the "transmitting user (operator)") has an access right for the electronic whiteboard indicated by the whiteboard ID (step S31).

When the transmitting user (operator) does not have an access right for the electronic whiteboard indicated by the whiteboard ID (No at step S1), the SV data control unit 12 searches the access right data setting table shown in FIG. 12 by using the user ID and thereby checks whether or not there is an area(s) for which the transmitting user (operator) has an access right among the plurality of areas of the electronic whiteboard indicated by the whiteboard ID (step S32).

When there is an area(s) for which the transmitting user (operator) has an access right (Yes at step S32), the SV data control unit 12 refers to the area data setting table 100 shown in FIG. 3 and the object data setting table 120 shown in FIG. 5, reads out the area data of the electronic whiteboard indicated by the whiteboard ID and the data of objects disposed in all the areas for which the transmitting user (operator) has an access right from the storage device 11, and sends the read data to the SV communication unit 13 in order to transmit them to the client terminal 20 of the requesting user (operator) (step S35).

On the other hand, when there is no area for which the transmitting user (operator) has an access right in the electronic whiteboard indicated by the whiteboard ID (No at step S32), the SV data control unit 12 generates error information and sends the generated error information to the SV communication unit 13 in order to transmit it to the client terminal 20 of the requesting user (operator) (step S33).

On the other hand, when the transmitting user (operator) has an access right for the electronic whiteboard indicated by the whiteboard ID in the step S31 (Yes at step S31), the SV data control unit 12 next searches for the access right type 115 in the access right data setting table 110B shown in FIG. 12 and thereby checks whether or not there is an area(s) for which "access unavailable" is set among the plurality of areas of the electronic whiteboard indicated by the whiteboard ID (step S35).

When there is no area for which "access unavailable" is set (No at step S35), the SV data control unit 12 refers to the area data setting table 100 shown in FIG. 3 and the object data setting table 120 shown in FIG. 5, reads out all the area data of the electronic whiteboard indicated by the whiteboard ID of the electronic whiteboard access request and all the object information thereof from the storage device 11, and sends the read data and information to the SV communication unit 13 in order to transmit them to the client terminal 20 of the user (operator) who has issued the request (step S37).

On the other hand, when there is an area(s) for which "access unavailable" is set (Yes at step S35), the SV data control unit 12 refers to the area data setting table 100 shown in FIG. 3 and the object data setting table 120 shown in FIG. 5, reads out the area data of the electronic whiteboard indicated by the whiteboard ID and the data of objects disposed in all the areas except for the area(s) for which "access unavailable" is set from the storage device 11, and sends the read data to the SV communication unit 13 in order to transmit them to the client terminal 20 of the requesting user (operator)" (step S34).

When the SV communication unit 13 receives information that should be transmitted to the client terminal 20 of the requesting user (operator) through the above-described operation performed by the SV data control unit 12, the SV communication unit 13 transmits the received information to the CL communication unit 23 of the client terminal 20 of the requesting user (operator) through the network 30.

Upon receiving the information from the server device 10, the CL communication unit 23 of the client terminal 20 sends the received information to the CL data control unit 22. The CL data control unit 22 converts the receiving information into drawing data capable of being displayed in a screen and sends the drawing data to the output device 24. The output device 24 draws the drawing data sent from the CL data control unit 22 on a display, and thereby displays it on the screen and shows it to the user (operator).

Fourth Exemplary Embodiment

Next, as a fourth exemplary embodiment, a case where the control of access rights is performed on the client terminal 20 side, instead of being performed on the server device 10 side, in contrast to the first to third exemplary embodiments is explained. Note that the system configuration of the electronic whiteboard system according to the fourth exemplary embodiment is identical to that of the first exemplary embodiment shown in FIG. 1. In the fourth exemplary embodiment, the server device 10 transmits access right information to the client terminal 20. Then, the CL data control unit 22 of the client terminal 20 controls access based on the access right information received from the server device 10.

An example of an operation in the fourth exemplary embodiment is explained hereinafter. When a user (operator) performs an operation for opening an electronic whiteboard of the server device 10 that is divided into a plurality of areas in order to access and view (or browse) the electronic whiteboard by using the input device 21 of the client terminal 20, the CL data control unit 22 of the client terminal 20 creates an electronic whiteboard access request including a user ID indicating the user (operator) and a whiteboard ID indicating the electronic whiteboard that the user is attempting to access and sends the created electronic whiteboard access request to the SV data control unit 12 through the CL communication unit 23, the network 30, and the SV communication unit 13 of the server device 10.

Upon receiving the electronic whiteboard access request from the client terminal 20, the SV data control unit 12 sends the whole area data of the electronic whiteboard indicated by the whiteboard ID of the electronic whiteboard access request and the whole object data of the electronic whiteboard together with information about an access right for each user for each area on the electronic whiteboard to the CL data control unit 22 through the SV communication unit 13, the network 30, and the CL communication unit 23 of the client terminal 20.

The CL data control unit 22 analyzes the information transmitted from the SV data control unit 12 of the server device 10, converts only the data of objects located in an area(s) for which the user (operator) who has performed the viewing request operation has an access right into drawing data, and sends the drawing data to the output device 24. The output device 24 draws the received drawing data on a display and shows it to the user (operator). The screen on which the drawing data is displayed is similar to that described above in the first exemplary embodiment and shown in FIGS. 7A and 7B.

When the user (operator) edits an object located in a specific area on an electronic whiteboard divided into a plurality of areas, the CL data control unit 22 checks whether or not the operation is performed for an area for which the user (operator) has an access right. Then, when the operation is performed for an area for which the user (operator) has an access right, the CL data control unit 22 sends the details of the operation in that area to the CL communication unit 23 and thereby transmits it to the server device 10. On the other hand, when the operation is performed for an area for which the user (operator) does not have an access right, the CL data control unit 22 does not send the details of the operation to the CL communication unit 23 and discards it.

Configurations of preferable exemplary embodiments according to the present invention have been explained above. However, it should be noted that the above-shown exemplary embodiments are merely examples of the present invention and thus do not limit the present invention. It will be understood by those of ordinary skill in the art that various changes in form and details may be made to the exemplary embodiments without departing from the spirit and scope of the present invention.

According to an electronic whiteboard system, an electronic whiteboard access right giving method, and an electronic whiteboard access right giving program in accordance with the present invention, an access right can be set (or defined) on a user-by-user basis and on an area-by-area basis in an electronic whiteboard divided into a plurality of areas. Therefore, an access right can be flexibly given to each area on the electronic whiteboard and a specific area on the electronic whiteboard can be effectively used as an area for sharing information with another user(s).

Further, the present invention is not limited to the above-described exemplary embodiments, and needless to say, various modifications can be made without departing from the spirit and scope of the present invention described above. For example, although the present invention is described as a hardware configuration in the above-described exemplary embodiments, the present invention is not limited to the hardware configurations. In the present invention, arbitrary processing can be also implemented by causing a CPU (Central Processing Unit) to execute a computer program.

In the above-described examples, the program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, a DVD (Digital Versatile Disc), a BD (Blu-ray (registered trademark) Disc), and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

The whole or part of the exemplary embodiments disclosed above can be described as, but not limited to, the following supplementary notes.

(Supplementary Note 1)

An electronic whiteboard system comprising:
  a server device comprising:
    a division unit that divides an electronic whiteboard into a plurality of areas;

a first storage unit that stores electronic whiteboard data related to the electronic whiteboard, area data related to the areas, and object data related to an object disposed in the areas;

a giving unit that gives an access right for the electronic whiteboard; and a first data communication unit that performs data communication with a client terminal used by a user; and the client terminal comprising:

a second data communication unit that performs data communication with the server device;

a first transmission unit that enters or edits the electronic whiteboard data, the area data, and the object data, and transmits the entered or edited data to the server device; and a first display unit that acquires the electronic whiteboard data, the area data, and the object data from the server device, converts the acquired data into drawing data, and displays the drawing data, wherein the giving unit gives an access right for each user on an area-by-area basis by using the areas obtained by dividing the electronic whiteboard.

(Supplementary Note 2)

The electronic whiteboard system described in Supplementary note 1, wherein the server device further comprises:

a first determination unit that, when the server device receives an access request for the electronic whiteboard from the client terminal, determines whether or not a user of the client terminal has an access right for the electronic whiteboard designated in the access request;

a first return unit that, when the user of the client terminal has the access right for the electronic whiteboard designated in the access request, returns all the area data related to the electronic whiteboard and all the object data to the client terminal that has issued the access request;

a first search unit that, when the user of the client terminal does not have the access right for the electronic whiteboard designated in the access request, checks whether or not there is an area for which the user has an access right among the plurality of areas obtained by dividing the electronic whiteboard;

a first selection unit that, when there is an area for which the user of the client device has the access right as a result of the search performed by the first search unit, selects the object data belonging to that area; and a second return unit that returns all the area data related to the electronic whiteboard designated in the access request and the object data belonging to the area selected by the first selection unit to the client terminal that has issued the access request.

(Supplementary Note 3)

The electronic whiteboard system described in Supplementary note 1, wherein the server device further comprises a third return unit that, when the server device receives an access request for the electronic whiteboard from the client terminal, returns the access right given for each user for each of the electronic whiteboards designated in the access request and the plurality of areas obtained by dividing the electronic whiteboard, and all the area data related to the electronic whiteboard designated in the access request and all the object data to the client terminal that has issued the access request, and the client terminal further comprises:

a second determination unit that determines whether or not a user who has issued the access request has an access right for the electronic whiteboard designated in the access request;

a second display unit that, when the user has the access right for the electronic whiteboard designated in the access request, converts all the area data related to the electronic whiteboard and all the object data into drawing data and displays the drawing data;

a second search unit that, when the user of the client terminal does not have the access right for the electronic whiteboard designated in the access request, checks whether or not there is an area for which the user has an access right among the plurality of areas obtained by dividing the electronic whiteboard;

a second selection unit that, when there is an area for which the user has the access right as a result of the search performed by the second search unit, selects the object data belonging to that area; and a third display unit that converts all the area data related to the electronic whiteboard designated in the access request and the object data belonging to the area selected by the second selection unit into drawing data and displays the drawing data.

(Supplementary Note 4)

The electronic whiteboard system described in Supplementary note 1, wherein the server device further comprises:

a third determination unit that determines, when the server device receives an edit request for the electronic whiteboard from the client terminal, whether or not a user of the client terminal has an access right for the electronic whiteboard designated in the edit request;

a first storage unit that, when the user of the client terminal has the access right for the electronic whiteboard designated in the edit request, stores the area data and the object data included as an edit operation result in the edit request in place of the area data and the object data, respectively, that have been stored as data belonging to the electronic whiteboard;

a third search unit that, when the user of the client terminal does not have the access right for the electronic whiteboard designated in the edit request, checks whether or not there is an area for which the user has an access right among the plurality of areas obtained by dividing the electronic whiteboard;

a second storage unit that, when there is an area for which the user of the client device has the access right as a result of the search performed by the third search unit, stores the object data belonging to that area among the object data included as the edit operation result in the edit request in place of the object data that has been stored as data belonging to that area;

an extraction unit that extracts all of other users who are accessing the electronic whiteboard designated in the edit request; and a second transmission unit that transmits the edit operation result included in the edit request to, among the other users extracted by the extraction unit, a user having an access right for the area to be edited on the electronic whiteboard designated in the edit request.

(Supplementary Note 5)

The electronic whiteboard system described in Supplementary note 1, wherein the server device further comprises:

a fourth determination unit that determines, when the server device receives an area expansion request for the electronic whiteboard from the client terminal, whether or not a user of the client terminal has an access right for the area on the electronic whiteboard designated in the area expansion request;

a third storage unit that, when the user of the client terminal has the access right for the area on the electronic whiteboard designated in the area expansion request, stores the area data and the object data included as an area expansion operation result in the area expansion request in place of the area data and the object data, respectively, that have been stored as data belonging to the area on the electronic whiteboard designated in the area expansion request;

a second storage unit that updates the area data and the object data related to an area located in an expanding direction with respect to the area on the electronic whiteboard designated in the area expansion request to data obtained by moving the area data and the object data according to a magnitude of expansion designated by the area expansion request, and stores the updated data as an area moving process result; and a third transmission unit that extracts all of other users who are accessing the electronic whiteboard designated in the area expansion request and transmits the area expanding operation result and the area moving process result to all of the extracted other users.

(Supplementary Note 6)

The electronic whiteboard system described in Supplementary note 1, wherein as the access right set for each user for the electronic whiteboard or the area obtained by dividing the electronic whiteboard, at least one of access right attributes including, at least, a displaying right, an object creating right, an object edit right, an object delete right, an area expansion right, and an area expansion available quantity indicating a maximum factor by which an original area can be expanded is set for each user for the electronic whiteboard or the area obtained by dividing the electronic whiteboard.

(Supplementary Note 7)

The electronic whiteboard system described in Supplementary note 1, wherein the electronic whiteboard system includes, as a type of the access right set for each user for the electronic whiteboard or the area obtained by dividing the electronic whiteboard, an access right indicating an access available right for permitting access and an access right indicating an access unavailable right for prohibiting access.

(Supplementary Note 8)

An electronic whiteboard access right giving method in an electronic whiteboard system comprising a server device and a client terminal, comprising:

in the server device,
dividing an electronic whiteboard into a plurality of areas;
storing electronic whiteboard data related to the electronic whiteboard, area data related to the areas, and object data related to an object disposed in the areas;
giving an access right for the electronic whiteboard; and
performing data communication with a client terminal used by a user; and in the client terminal,
performing data communication with the server device;
entering or editing the electronic whiteboard data, the area data, and the object data, and transmitting the entered or edited data to the server device; and
acquiring the electronic whiteboard data, the area data, and the object data from the server device, converting the acquired data into drawing data, and displaying the drawing data, wherein the electronic whiteboard access right giving method further comprises, in the server device, giving an access right for each user on an area-by-area basis by using the areas obtained by dividing the electronic whiteboard.

(Supplementary Note 9)

The electronic whiteboard access right giving method described in Supplementary note 8, further comprising: in the server device, determining, when the server device receives an access request for the electronic whiteboard from the client terminal, whether or not a user of the client terminal has an access right for the electronic whiteboard designated in the access request;

returning, when the user of the client terminal has the access right for the electronic whiteboard designated in the access request, all the area data related to the electronic whiteboard and all the object data to the client terminal that has issued the access request;

checking, when the user of the client terminal does not have the access right for the electronic whiteboard designated in the access request, whether or not there is an area for which the user has the access right among the plurality of areas obtained by dividing the electronic whiteboard;

selecting, when there is an area for which the user of the client device has the access right as a result of the search performed by the search unit, the object data belonging to that area; and returning all the area data related to the electronic whiteboard designated in the access request and the object data belonging to the selected area to the client terminal that has issued the access request.

(Supplementary Note 10)

A non-transitory computer readable medium storing an electronic whiteboard access right giving program, wherein the electronic whiteboard access right giving method described in Supplementary note 8 is implemented as a computer executable program.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An electronic whiteboard system comprising:
a server device comprising:
a division unit configured to divide an electronic whiteboard into a plurality of areas;
a first storage unit configured to store electronic whiteboard data related to the electronic whiteboard, area data related to the areas, and object data related to an object disposed in the areas;
a giving unit configured to give an access right for the electronic whiteboard; and
a first data communication unit configured to perform data communication with a client terminal used by a user; and
the client terminal comprising:
a second data communication unit configured to perform data communication with the server device;

a first transmission unit configured to enter or edit the electronic whiteboard data, the area data, and the object data, and transmit the entered or edited data to the server device; and a first display unit configured to acquire the electronic whiteboard data, the area data, and the object data from the server device, convert the acquired data into drawing data, and display the drawing data, wherein the giving unit is configured to give an access right for each user on an area-by-area basis, such that each user has writable access to the area to which the user corresponds and does not have the writable access to any other area, by using the areas obtained by dividing the electronic whiteboard.

2. The electronic whiteboard system according to claim 1, wherein the server device further comprises:

a first determination unit configured to, when the server device receives an access request for the electronic whiteboard from the client terminal, determine whether or not a user of the client terminal has an access right for the electronic whiteboard designated in the access request;

a first return unit configured to, when the user of the client terminal has the access right for the electronic whiteboard designated in the access request, return all the area data related to the electronic whiteboard and all the object data to the client terminal that has issued the access request;

a first search unit configured to, when the user of the client terminal does not have the access right for the electronic whiteboard designated in the access request, check whether or not there is an area for which the user has an access right among the plurality of areas obtained by dividing the electronic whiteboard;

a first selection unit configured to, when there is an area for which the user of the client device has the access right as a result of the search performed by the first search unit, select the object data belonging to that area; and a second return unit configured to return all the area data related to the electronic whiteboard designated in the access request and the object data belonging to the area selected by the first selection unit to the client terminal that has issued the access request.

3. The electronic whiteboard system according to claim 1, wherein the server device further comprises a third return unit configured to, when the server device receives an access request for the electronic whiteboard from the client terminal, return the access right given for each user for each of the electronic whiteboards designated in the access request and the plurality of areas obtained by dividing the electronic whiteboard, and all the area data related to the electronic whiteboard designated in the access request and all the object data to the the client terminal that has issued the access request, and the client terminal further comprises:

a second determination unit configured to determine whether or not a user who has issued the access request has an access right for the electronic whiteboard designated in the access request;

a second display unit configured to, when the user has the access right for the electronic whiteboard designated in the access request, convert all the area data related to the electronic whiteboard and all the object data into drawing data and displays the drawing data;

a second search unit configured to, when the user of the client terminal does not have the access right for the electronic whiteboard designated in the access request, check whether or not there is an area for which the user has an access right among the plurality of areas obtained by dividing the electronic whiteboard;

a second selection unit configured to, when there is an area for which the user has the access right as a result of the search performed by the second search unit, select the object data belonging to that area; and a third display unit configured to convert all the area data related to the electronic whiteboard designated in the access request and the object data belonging to the area selected by the second selection unit into drawing data and display the drawing data.

4. The electronic whiteboard system according to claim 1, wherein the server device further comprises:

a third determination unit configured to, when the server device receives an edit request for the electronic whiteboard from the client terminal, determine whether or not a user of the client terminal has an access right for the electronic whiteboard designated in the edit request;

a first storage unit configured to, when the user of the client terminal has the access right for the electronic whiteboard designated in the edit request, store the area data and the object data included as an edit operation result in the edit request in place of the area data and the object data, respectively, that have been stored as data belonging to the electronic whiteboard;

a third search unit configured to, when the user of the client terminal does not have the access right for the electronic whiteboard designated in the edit request, check whether or not there is an area for which the user has an access right among the plurality of areas obtained by dividing the electronic whiteboard;

a second storage unit configured to, when there is an area for which the user of the client device has the access right as a result of the search performed by the third search unit, store the object data belonging to that area among the object data included as the edit operation result in the edit request in place of the object data that has been stored as data belonging to that area;

an extraction unit configured to extract all of other users who are accessing the electronic whiteboard designated in the edit request; and a second transmission unit configured to transmit the edit operation result included in the edit request to, among the other users extracted by the extraction unit, a user having an access right for the area to be edited on the electronic whiteboard designated in the edit request.

5. The electronic whiteboard system according to claim 1, wherein the server device further comprises:

a fourth determination unit configured to, when the server device receives an area expansion request for the electronic whiteboard from the client terminal, determine whether or not a user of the client terminal has an access right for the area on the electronic whiteboard designated in the area expansion request;

a third storage unit configured to, when the user of the client terminal has the access right for the area on the electronic whiteboard designated in the area expansion request, store the area data and the object data included as an area expansion operation result in the area expansion request in place of the area data and the object data, respectively, that have been stored as data belonging to the area on the electronic whiteboard designated in the area expansion request;

a second storage unit configured to update the area data and the object data related to an area located in an expanding direction with respect to the area on the electronic whiteboard designated in the area expansion request to data obtained by moving the area data and the object data according to a magnitude of expansion designated by the area expansion request, and store the updated data as an area moving process result; and a third transmission unit configured to extract all of other users who are accessing the electronic whiteboard designated in the area expansion request and transmits the area expanding operation result and the area moving process result to all of the extracted other users.

6. The electronic whiteboard system according to claim 1, wherein as the access right set for each user for the electronic whiteboard or the area obtained by dividing the electronic whiteboard, at least one of access right attributes including, at least, a displaying right, an object creating right, an object edit right, an object delete right, an area expansion right, and an area expansion available quantity indicating a maximum factor by which an original area can be expanded is set for each user for the electronic whiteboard or the area obtained by dividing the electronic whiteboard.

7. The electronic whiteboard system according to claim 1, wherein the electronic whiteboard system includes, as a type of the access right set for each user for the electronic whiteboard or the area obtained by dividing the electronic whiteboard, an access right indicating an access available right for permitting access and an access right indicating an access unavailable right for prohibiting access.

8. An electronic whiteboard access right giving method in an electronic whiteboard system comprising a server device and a client terminal, comprising:

in the server device,
dividing an electronic whiteboard into a plurality of areas;

storing electronic whiteboard data related to the electronic whiteboard, area data related to the areas, and object data related to an object disposed in the areas;

giving an access right for the electronic whiteboard; and performing data communication with a client terminal used by a user; and in the client terminal,
performing data communication with the server device;
entering or editing the electronic whiteboard data, the area data, and the object data, and transmitting the entered or edited data to the server device; and
acquiring the electronic whiteboard data, the area data, and the object data from the server device, converting the acquired data into drawing data, and displaying the drawing data, wherein the electronic whiteboard access right giving method further comprises, in the server device, giving an access right for each user on an area-by-area basis by using the areas obtained by dividing the electronic whiteboard.

9. The electronic whiteboard access right giving method according to claim 8, further comprising: in the server device, determining, when the server device receives an access request for the electronic whiteboard from the client terminal, whether or not a user of the client terminal has an access right for the electronic whiteboard designated in the access request;

returning, when the user of the client terminal has the access right for the electronic whiteboard designated in the access request, all the area data related to the electronic whiteboard and all the object data to the client terminal that has issued the access request;

checking, when the user of the client terminal does not have the access right for the electronic whiteboard designated in the access request, whether or not there is an area for which the user has the access right among the plurality of areas obtained by dividing the electronic whiteboard;

selecting, when there is an area for which the user of the client device has the access right as a result of the search performed by the search unit, the object data belonging to that area; and returning all the area data related to the electronic whiteboard designated in the access request and the object data belonging to the selected area to the client terminal that has issued the access request.

10. A non-transitory computer readable medium storing an electronic whiteboard access right giving program, wherein the electronic whiteboard access right giving method according to claim 8 is implemented as a computer executable program.

* * * * *